Feb. 23, 1971  D. A. TAYLOR  3,565,463
SECURITY SYSTEM

Original Filed Feb. 5, 1968  2 Sheets-Sheet 2

INVENTOR
DEREK ARTHUR TAYLOR

By Cushman, Darby & Cushman
ATTORNEYS

United States Patent Office 3,565,463
Patented Feb. 23, 1971

3,565,463
SECURITY SYSTEM
Derek Arthur Taylor, Maidenhead, England, assignor to Thomas De La Rue and Company Limited, London, England, a British company
Continuation of application Ser. No. 702,996, Feb. 5, 1968. This application Sept. 15, 1969, Ser. No. 861,220
Claims priority, application Great Britain, Feb. 7, 1967, 5,802/67; Mar. 22, 1967, 13,497/67; July 27, 1967, 34,521/67
Int. Cl. G09f 3/03
U.S. Cl. 283—10
6 Claims

ABSTRACT OF THE DISCLOSURE

A system of security which includes the use of a card having transparent areas with an adhesive layer thereon, and a stamp with markings on one face, which, when the stamp is affixed to the adhesive layer so that the markings can be seen through a transparent area, is so affected that any attempt to remove the stamp results in its alteration or damage.

---

This application is a continuation of application 702,-996 filed Feb. 5, 1968 and now abandoned.

This invention relates to a system of securitiy which employs a card together with stamps which are to be stuck on to the card. The expression "system of security" includes system by means of which a user may secure from a person, firm, company or authority the right to obtain goods or services without the passage of money or other consideration at the material time. For example a system of security may be applied to indicate that some right has been secured by the fulfillment of an obligation such as the payment of a tax, license fee or insurance premium, or by the existence of some special circumstance, such as age or sickness. Such a system may be used to secure the right to park a vehicle for an agreed period of time or to use a transport service for a given period of time. Alternatively to being used to indicate the purchase of some goods or service, such a system may be employed to show and record that the ues of some goods or service is being exercised, for which payment will be made later.

The system has particular, though not exclusive application in the administration of parking systems for motor vehicles in urban areas where certain users require the faciilty of parking their vehicles for comparatively long periods and parking meters are inconvenient for use use.

Systems for controlling parking in which discs are displayed in windscreens or windshields of motor vehicles are, of course known, and these include the use of discs of a particular colour indicating the right to park in a particular area together with the ability to set the disc to indicate the time of arrival so that the duration of the period of parking can be assessed at any time thereafter. There is no provision with such systems for recording that a particular right has been secured or that a particular service has been used, and furthermore, such systems may be misused comparatively easily.

According to one aspect of the present invention there is provided a system of security which includes, in combination, a card, transparent areas on the card, a stamp for use with the card, markings on one face of the stamp which relate to the security concerned, and a self-adhesive material on at least either one face of the stamp over a transparent area, or the face of the stamp bearing the markings, the combination being effective when the face of the stamp bearing the markings is affixed by the self-adhesive material to a transparent area of the card to cause alteration of or damage to the stamp upon removal or attempted removal.

According to another aspect of the invention there is provided, for use in the said system of security which employs stamps having markings on one face which relate to the security concerned, a card which includes a first sheet having transparent areas to one face of which stamps may be affixed, a layer of self-adhesive material on one face of the transparent areas, a readily strippable protective backing sheet on the first sheet covering the layer of self-adhesive material and perforations in the backing sheet defining transparent areas each corresponding to the dimensions of the stamp whereby the backing sheet may be removed from a particular one of the areas of the first sheet corresponding to the dimensions of the stamp.

According to yet a further aspect of the invention there is provided, for use in the said system of security which employs a card having transparent areas, a stamp including a paper base made from a mixture including fibres of which at least 75% are short, a coating containing a filler and a binder on one face of the paper base and markings on the said coating which relate to the security concerned.

Embodiments of the invention will now be described with reference to the accompanying drawings, in which.

Figure 1:
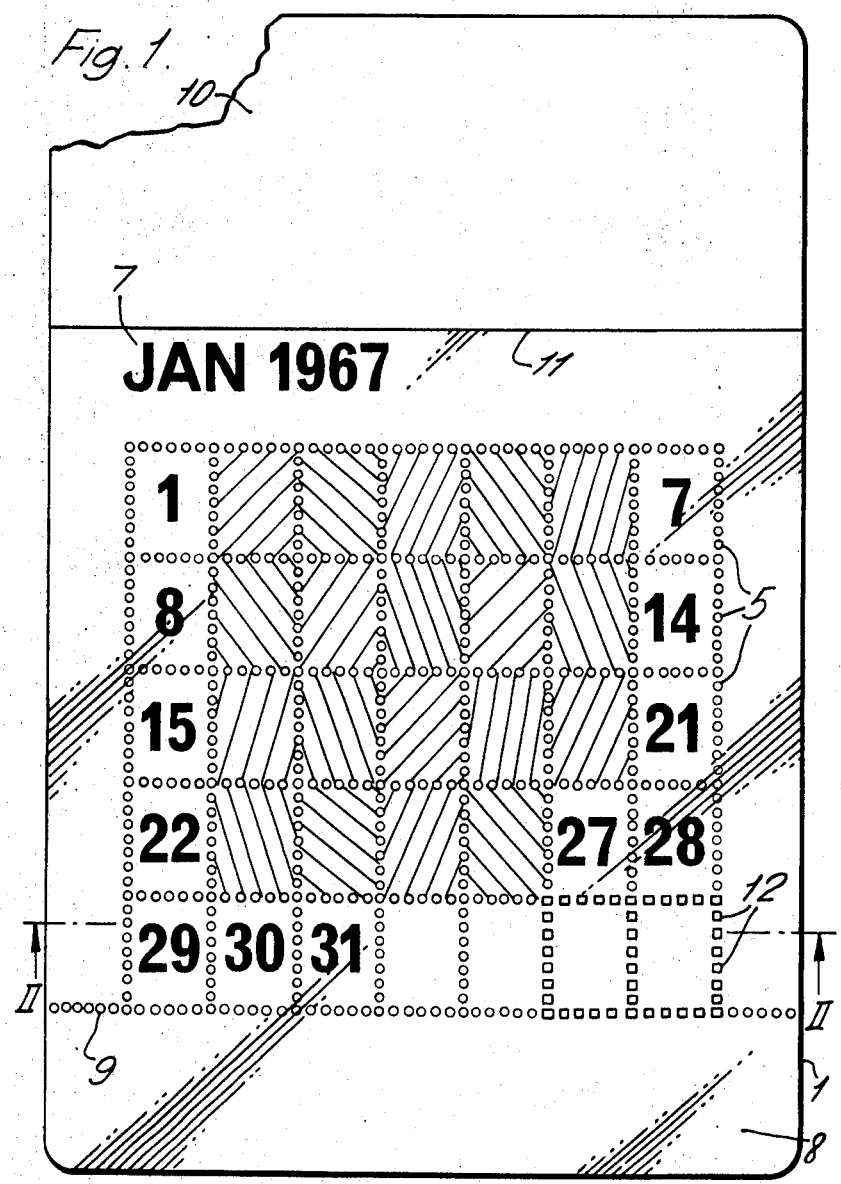
FIG. 1 shows a plan view of a card on which stamps have been stuck and which may be used as a travel ticket.
Figure 2:
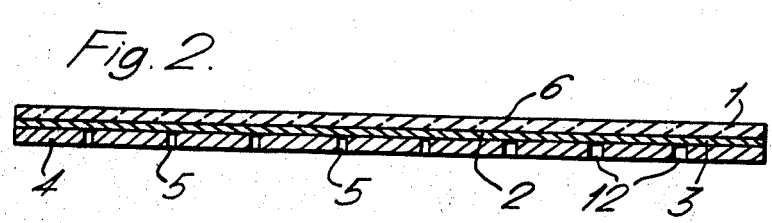
FIG. 2 shows a cross section through the card of FIG. 1 on the line 2—2.

Referring to FIGS. 1 and 2 there is shown a card including a sheet 1 made of a transparent polyvinylchloride (PVC) material which is slightly flexible but sufficiently rigid to remain upright without support and which has a thickness of two hundredths of an inch (0.51 millimetre). The sheet 1 is coated on its surface 2 with a self-adhesive layer 3 over which there is placed a protective backing sheet 4 made of paper treated with an agent which prevents the paper from adhering permanently to the layer 3 and protects the layer 3 from contamination before its intended use; in this example it is silicone treated. By self-adhesive is meant a material which, at normal ambient temperatures, is adhesive without any additive or moisture. The layer 3 is of the polymethacrylate type. One area of the backing sheet 4 is perforated, or punched, as indicated by the circular perforations 5, along lines which divide the sheet into rectangular areas, each of which is printed with a number corresponding to a date. The perforations or punchings 5 forming the rectangular areas, are visible, as may be seen from FIG. 1, through the front face 6 of the sheet 1 together with certain of the numbers indicating the date. The months and year are also printed on the backing sheet as indicated at 7 so that they are visible through the transparent sheet 1.

An area 8 of the backing sheet 4 below a row 9 of perforations, is left blank, as may be seen from FIG. 1, and this area of the backing sheet may easily be removed by tearing along the row 9 and be replaced by the issuing authority with a sheet bearing the name of the user of the ticket and the stations between which it is valid. This issuing authority sheet may bear markings, either on one or both faces, which are designed to make forgery more difficult. Such markings are sometimes known as "security markings" or "security printing" and are designed for this purpose rather than to convey information. The name of the issuing authority is printed on the front face 6 of the sheet within an area 10 above a line 11. In this arrangement there is neither an adhesive layer nor a backing sheet on the rear face 2 of the sheet 1 over the area 10.

In modifications of the arrangement described it is possible for printing to be applied to the front face 6 over the area 8 and the issuing authority sheet to be stuck over the area 10 on the rear face 2 of the sheet 1, or for various combinations of these arrangements to be used.

The perforations or punchings need not be circular. As shown in FIG. 1 at 12, they may, for example, be rectangular. Removal of portions of the backing sheet necessarily results in tearing of the sheet in the intervals between the perforations or punchings and this also facilitates the detection of any restoration of a removed portion.

The face 6 within the area 10 is printed by a silk screen process and this process could be used to print the date and month on any area of the sheet 1.

In addition to the printing of the month, year and date of the day on the surface of the backing sheet visible through the transparent sheet 1, the dates are printed in the rectangular areas on the rear surface of the backing sheet in order to enable an area to be identified before it is removed. There may also be markings on one or both surfaces of the backing sheet which are directed to the prevention of forgery.

It is also possible for the dates to be printed on a face of the sheet 1, and these dates may coincide or nearly coincide with the dates on the front face of the backing sheet. Anti-forgery markings may be made on one or both faces of the sheet 1.

The sheet 1 may be made of any other suitable transparent material than that referred to, for example, polyethylene terephthalate may be used.

The adhesive layer 3 may have a polyisobutylene base as an alternative to the type referred to above.

The backing sheet 4 may be cut, either continuously or intermittently, instead of being perforated, to provide the lines dividing the sheet into rectangular areas, and the cuts may be made while the backing sheet 4 is in position on the sheet 1, by passing the assembly beneath a number of parallel rotating cutting wheels, adjusted in depth to cut only the backing sheet.

In the operation of a system using the card shown in FIGS. 1 and 2 as a travel ticket or warrant, a rectangular area of the backing sheet 4, defined by the perforations 5 and bearing the date of the day on which it is desired to travel is removed and a stamp or token is fixed to the self-adhesive material 3 which is laid bare by the removal of this area of the backing sheet. From FIG. 1 it can be seen that the rectangular areas bearing the dates of the second to the sixth, the ninth to the thirteenth, the sixteenth to the twentieth, and the twenty-third to the twenty-sixth of January 1967 have been removed and the hatch lines which cover these areas indicate the stamps or tokens which have been positioned in place of the removed areas of the backing sheet. The stamps may be made of the paper or other similar material in the form of a thin sheet.

In a modification (not shown) of the arrangement shown in FIG. 1 the backing sheet itself is used to provide the stamps or tokens. In this modification, the front face of the backing sheet, which is initially in contact with the self-adhesive layer 3, but which is silicone treated so that it does not adhere irremovably thereto, is printed both with dates and markings which are designed to render the system less easy to forge, though this is not essential. The backing sheet is perforated as shown at 5, in FIG. 1, a coating of a mixture, including a filler and a binder, containing clay, casein and latex, is applied to the rear face of the backing sheet, and, in the rectangular areas defined by the perforations 5, there are printed, on this coating, both numbers corresponding to dates and an indication of the value given to each rectangular area. When it is required to use the card as a travel ticket or warrant a portion of the backing sheet corresponding to a particular rectangular area and bearing the date corresponding to the date on which it is desired to travel may be removed, reversed and stuck on to the area of the adhesive layer 3, which has been disclosed by the removal of the portion of the backing sheet. The date and value of the stamp corresponding to the particular rectangular area is thus visible, in its correct position through the sheet 1. This form of construction is normally contained within a transparent protective wallet in order to protect the printed rear surface of the backing sheet.

Figure 3A:
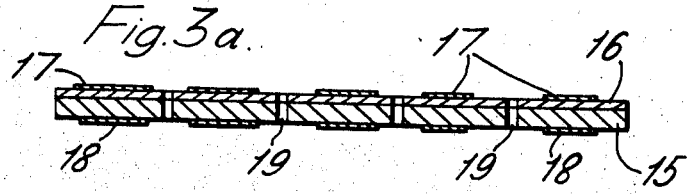
FIGS. 3a and 3b show sections through a sheet of stamps for use with a card of the type shown in FIG. 1.
Figure 3B:
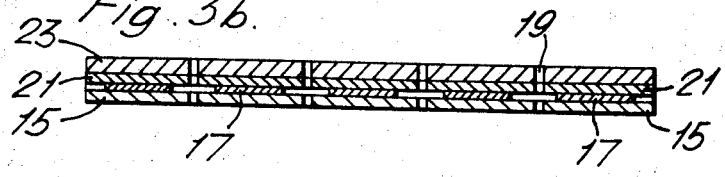

Stamps for use with the card illustrated in FIG. 1 may employ, as indicated in the cross-sectional drawings of FIGS. 3a and 3b, a sheet of paper 15 which has been made specially tearable by arranging that it is composed of a mixture including fibres of which at least 75% are short. These fibres are preferably derived from types of wood, for example beech and eucalyptus, which produce short fibres. In a preferred embodiment the percentage of short to long fibres in this mixture is 80:20%. Alternatively newsprint may be used as the paper base. The sheet 15 is coated on one surface with a layer, including a filler and a binder, containing clay, casein and latex as indicated at 16 in FIG. 3a. There are then applied to this layer printed markings 17, which may partly be present to make forgery more difficult and partly to indicate the purpose of the stamp, the value ascribed to the stamp, or the sum of money that either has been, or will be, paid for it. These markings it may be seen, are to some extent diffused into the coating 16, and may extend into the paper base 15. Printed markings, as indicated at 18, may also be applied to the opposite surface of the stamps to the markings 17, and these markings 18 may be directed particularly to making forgery more difficult.

The sheet of stamps is perforated as indicated at 19, in order to make it possible for individual stamps to be removed from the sheet more easily. The coating of clay, casein and latex makes the stamp more readily adherent to the self-adhesive layer 3 on the sheet 1 of the card. Although the embodiment of FIG. 3a is preferred, a further possible construction is shown in FIG. 3b in which an adhesive layer 21 is provided on the printed markings on the surface of the sheet 15, and a readily removable protective sheet 23 is provided to cover the adhesive layer 21 in a similar manner to the backing sheet 4 on the adhesive layer 3 of the card. The layer 21 may co-operate with the adhesive layer 3 on the sheet 1.

Alternatively the sheet 1 may have no adhesive layer 3, in which case adhesion between the stamp and the sheet is provided solely by the adhesive layer 21 on the stamp. Although, in the drawing there is shown, in the interest of clarity, a space between the paper sheet 15 and the adhesive layer 21, this space does not, in practice, exist. The arrangement of FIG. 3b is not preferred because its use results in the omission of the protective sheet 4 from the card so that the ability to check misuse of the card through signs left by tampering with the backing sheet 4 is lost.

Figure 4:
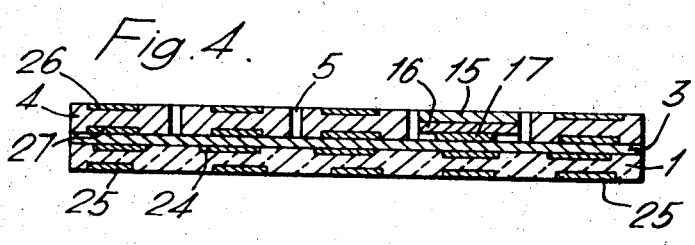
FIG. 4 shows a section through a card to which a stamp is affixed.

Referring to FIG. 4 there is shown a portion of a card consisting of a transparent sheet 1 having printing or markings 24 and 25 on its opposite surfaces, an adhesive layer 3 on one surface of the sheet 1 and a backing sheet 4, having markings 26 and 27 on its opposite surfaces. The backing sheet 4 is perforated, as indicated at 5, a rectangular area of the backing sheet, defined by the perforations has been removed, and a stamp, consisting of a sheet of paper 15, having a coating 16 of clay, casein and latex, and markings 17, has been stuck on to the adhesive layer 3 so that the markings 17 are visible through the sheet 1.

The use of a good and fast acting adhesive is one factor assisting in preventing the re-use of a stamp. Another factor is the use of the previously mentioned comparatively high proportion of short fibres in the composition of the paper used for the stamps. Both of these factors are aimed at making it impossible to remove a stamp, once applied to a card, without such damage that its re-use is impossible. In our preferred embodiment the adhesive coating is provided at a rate of between 30 to 40 grammes per square metre. The normal commercial rate of use of the adhesive is between 18 and 25 grammes per square metre.

One way of ensuring that a stamp is effectively attached to the adhesive layer on the card is by causing it to undergo a colour change when it is correctly and effectively attached to the card. This colour change may be achieved by including for example gallic acid, in the adhesive 3 on the sheet, and ferric ammonium sulphate in the markings 17 on the face of the stamp.

An alternative combination is the use of crystal violet lactone with a kaolin or a weak acid. The chemicals are so chosen and arranged that the transparency of the sheet 1 is not unduly affected.

The coating 16 may, of course, be omitted from the stamp provided that the bond between the adhesive 3 and the paper 15 is such as to ensure that the stamp will be torn, damaged or otherwise defaced in any attempt to remove it once it has been struck on to the sheet 1.

A smooth surface to the face of the paper 15 forming the base of the stamp is an aid in increasing the strength of the bond. When the coating 16 is employed on the stamp base 15, it is possible for there to be greater affinity between one or more of the constituents of the coating 16 and the adhesive 3 on the sheet, than there is between th paper and the adhesive 3, so that a desired strengthening of the bond is obtained and the likelihood of the stamp being damaged upon attempted removal is increased. Similarly it may be arranged that ink used for the markings on the stamps is of such a nature that it adheres better to the sheet 1 than it does to the body of the stamp.

It is desirable to make at least a part of the dyes used for printing the markings 17 and 18 on the stamps, or the markings 24 to 27 on the sheets 1 and 4, soluble in non-aqueous solvents e.g. alcohol and petrol (gasoline). This renders difficult the removal or rendering ineffective of the adhesive material for the purpose of misusing the system, without producing detectable changes in the markings. In certain circumstances it may be necessary to make the markings sensitive to water so that discoloration occurs in the presence of water. It is also desirable for the self-adhesive layer to be insoluble in water.

Other forms of printing than silk screen printing may, of course, be used and one or more different colours may be employed in making the markings and in the basic sheet material 15 to enable them to be distinctive.

In systems which employ payment after use and the card provides a record of any use, it is particularly important that evidence of any misuse or tampering shall be detectable comparatively easily. In addition or alternative to the use of perforations or punched holes with rectangular corners, making the accurate restoration of a removed portion of a backing sheet very difficult, the use of special markings on the sheet 1, the backing sheet 4 and the stamps, making either forgery difficult or the use of unauthorized materials easy to see, and the use of a colour change, making clear a correct use, it is possible to use, for the backing sheet, a material that wrinkles or tears comparatively easily so that any tampering with, or replacement of, the backing sheet can be detected.

A further means for detecting if an area of the transparent sheet 1 has been used is to print the stamps with an ink which comes off, at least partially, on to the adhesive layer 3 so that, even if a way is found of removing the main body of the stamp, there remains on the card evidence that the area of the card has been used and the stamp is thereby altered or damaged. The alteration to the stamp, even if it is not perceptible on direct visual inspection of the stamp can be detected either from the fact that marks are left on the adhesive layer or by more detailed examination of the stamp.

Although in the particular embodiment the system is described with reference to a card and stamps are used as a travel ticket or voucher, valid for a particular period, the system, card and stamps are clearly not limited to such use and it can clearly be used for a variety of other purposes, including systems for allowing the parking of motor vehicles for a predetermined period of time as mentioned in the introduction to the specification.

The sheet applied to either the area 8 or the area 10 of the sheet 1, by the issuing authority, may also be made, in a similar fashion to the stamps, so that once it has been affixed to the card, any attempt to remove it results in it being altered or damaged, and it may thus be considered to be a stamp.

What is claimed is:

1. In security apparatus, the combination of a card, said card having transparent areas thereon, a stamp for use with the card, said stamp having a security denoting face, said face having markings thereon which relate to the security concerned, and self-adhesive means, said self-adhesive means being adapted to secure said stamp to a one of said transparent areas of said card, the combination being effective when said security denoting face of said stamp is affixed by said self-adhesive means to said one transparent area of the card whereby the appearance of said security denoting face of said stamp is changed by its at least partial removal from said transparent area, the improvement residing in the bond between said self-adhesive means and the security denoting surface of the stamp being stronger than the bond between the security-denoting surface of the stamp and the portions of the stamp underlying said security-denoting surface.

2. Security apparatus according to claim 1 in which the said stamp comprises a base, said base consisting of paper containing a mixture of fibres of which at least 75% are short, a coating, said coating containing a filler and a binder, said binder being included with said coating on said security denoting face, said security markings being arranged on said coating.

3. In security apparatus, the combination of a card, said card having transparent areas thereon, a stamp for use with the card, said stamp having a security denoting face, said face having markings thereon which relate to the security concerned, and self-adhesive means, said self-adhesive means being adapted to secure said stamp to a one of said transparent areas of said card, the combination being effective when said security denoting face of said stamp is affixed by said self-adhesive means to said one transparent area of the card whereby the appearance of said security denoting face of said stamp is changed by its at least partial removal from said transparent area, the said transparent area being coated with a material co-operable with said security denoting face of said stamp to produce a colour change visible through said transparent area on said security denoting surface when said stamp is affixed to said card.

4. In security apparatus, the combination of a card, said card having transparent areas thereon, a stamp for use with the card, said stamp having a security denoting face, said face having markings thereon which relate to the security concerned, and self-adhesive means, said self-adhesive means being adapted to secure said stamp to one of said transparent areas of said card, the combination being effective when said security denoting face of said stamp is affixed by said self-adhesive means to said one transparent area of the card whereby the appearance of said security denoting face of said stamp is changed by its at least partial removal from said transparent area, the improvement residing in said card comprises a first sheet, said first sheet having the said transparent area located thereon, said self-adhesive means comprises a layer of self-adhesive material on said one face of said transparent areas, and said card further comprises a readily strippable protective backing sheet carried by said first sheet and covering said layer of self-adhesive material and further having perforations thereon defining said transparent areas whereby portions of said backing sheet may be removed to expose desired transparent areas and allow said affixing of said stamps.

5. Security apparatus according to claim 4 in which said backing sheet is provided with security markings on the face thereof not in contact with said adhesive layer.

6. In security apparatus, the combination of a card, said card having transparent areas thereon, a stamp for use with the card, said stamp having a security denoting face, said face having markings thereon which relate to the security concerned, and self-adhesive means, said self-adhesive means being adapted to secure said stamp to a one of said transparent areas of said card, the combination being effective when said security denoting face of said stamp is affixed by said self-adhesive means to said one transparent area of the card whereby the appearance of said security denoting face of said stamp is changed by its at least partial removal from said transparent area, the improvement residing in said stamp comprising a base, said base consisting of paper containing a mixture of fibres of which at least 75% are short, a coating, said coating containing a filler and a binder, said binder being included with said coating on said security denoting face, said security markings being arranged on said coating.

References Cited
UNITED STATES PATENTS

| | | | |
|---|---|---|---|
| 200,702 | 2/1878 | Dewe | 283—10 |
| 1,998,237 | 4/1935 | Himmel | 283—8.2X |
| 2,083,206 | 6/1937 | Schoeller | 283—8.1X |
| 2,568,427 | 9/1951 | Wolowitz | 283—7X |

LAWRENCE CHARLES, Primary Examiner